United States Patent [19]

Howlett

[11] 4,098,494
[45] Jul. 4, 1978

[54] METHOD AND APPARATUS FOR MAKING BATTERY PASTE

[75] Inventor: Philip C. Howlett, Wheaton, Ill.

[73] Assignee: National Engineering Company, Chicago, Ill.

[21] Appl. No.: 719,822

[22] Filed: Sep. 2, 1976

[51] Int. Cl.$^2$ .............................................. B01F 7/16
[52] U.S. Cl. .................................... 366/144; 241/58;
366/168; 366/149; 366/192; 252/182.1
[58] Field of Search ...................... 429/225, 228, 134;
252/182.1; 259/8, 23, 24, 43, 44, 178 A; 141/35,
32, 33; 241/58

[56] References Cited

U.S. PATENT DOCUMENTS

| | | | |
|---|---|---|---|
| 1,288,546 | 6/1917 | Flanders | 252/182.1 |
| 2,202,489 | 5/1940 | Havel | 252/182.1 |
| 2,219,404 | 10/1940 | Simpson | 241/58 |
| 2,226,023 | 12/1940 | Simpson | 241/58 |
| 2,471,487 | 5/1949 | Granath | 259/44 |
| 3,304,588 | 2/1967 | McIlvaine | 241/58 |
| 3,406,950 | 10/1968 | McIlvaine | 259/151 |
| 3,456,906 | 7/1969 | Troy | 241/47 |
| 3,599,649 | 8/1971 | Troy | 134/57 R |
| 3,744,768 | 7/1973 | Kauffman et al. | 259/154 |
| 3,963,517 | 6/1976 | Eckerbonn | 252/182.1 |

Primary Examiner—Benjamin R. Padgett
Assistant Examiner—Irwin Gluck
Attorney, Agent, or Firm—Mason, Kolehmainen, Rathburn & Wyss

[57] ABSTRACT

Apparatus for making battery paste comprises a mixing chamber having a floor with a cylindrical upstanding side wall and a top cover. A mixing head is mounted for rotation in the chamber including at least one mulling wheel and at least one plow for moving the battery paste into the path of the mulling wheels. A cooling system is provided for the mixing chamber and its contents including a plenum chamber in direct contact with the underside of the mixing chamber floor for cooling the floor and a plurality of riser ducts extend upwardly from the plenum chamber in direct contact with the side wall. At the upper end of the risers deflectors are provided for directing a discharge of cooling air downwardly and inwardly of the upper end portion of the mixing chamber to cool the material. An exhaust system is provided for removing heat, moisture and fumes developed in the chamber and a liquid supply system is provided for additional material cooling and for washing the interior surfaces of the chamber. The washing liquid is retained for make-up liquid for the next batch of battery paste to be mixed.

A method of making battery paste includes the introduction of metered quantities of solids and acid into a quantity of make-up washing water already present in the mixing chamber from the preceding washing operation. This water is used for cooling, washing and helps retain needed oxides for the battery paste which would otherwise be carried away and possibly cause water pollution problems.

7 Claims, 2 Drawing Figures

METHOD AND APPARATUS FOR MAKING BATTERY PASTE

BRIEF DESCRIPTION OF THE INVENTION

A. Field of the Invention

The present invention relates to a new and improved method and apparatus for making battery paste. More particularly, it is an object of the invention to provide a new and improved method of making battery paste wherein wash down liquid from each batch operation is used for cooling, washing and for make-up water for the following batch of battery paste.

Another object of the present invention is to provide a new and improved method of the character described where the heat developed during the battery paste mixing process is rapidly carried off with complete temperature control.

Another object of the present invention is to provide a new and improved apparatus for making battery paste. More particularly, an object of the invention is to provide a new and improved apparatus of the character described having a mixing chamber with an improved cooling system for carrying away the heat developed in the battery paste mixing process.

Another object of the present invention is to provide a new and improved apparatus of the character described having a unique system for cooling the mixing chamber floor and walls and for washing down the interior surfaces of the mixing chamber after each batch is discharged to prevent corrosion.

Another object of the present invention is to provide a new and improved apparatus of the character described wherein wash down water from each batch is utilized as make-up water for the following batch of paste and thereby save oxides which would otherwise be washed away.

Another object of the present invention is to provide a new and improved apparatus of the character described wherein the mixing chamber is formed of water tight welded construction and is directly cooled by air passing against the floor, side wall and into the interior thereof.

B. Description of the Prior Art

United states Pat. Nos. 2,219,404 and 2,226,023 are directed to a method and apparatus for making battery paste wherein coolant air is delivered into the mixing chamber only from the upper side thereof and does not come in direct contact with the bottom or lower side walls of the mixing chamber and accordingly, does not provide cooling for the chamber walls. U.S. Pat. No. 2,471,487 shows a mixer having a lower floor with a water jacket around only a small area at the periphery. U.S. Pat. Nos. 3,304, 588; 3,406,950; 3,456,906 and 3,599,649 disclose mixing apparatuses for granular materials wherein cooling air is injected into lower levels of the mixing chamber through openings provided in the side wall thereof for direct cooling of the material being treated. U.S. Pat. No. 3,744,768 shows a mixer for granulated material wherein coolant and mixing water is sprayed into the material in a mixing chamber from nozzles both in the base or floor of the chamber for lubrication of the moving plows and is sprayed from above the material for cooling and moisturizing of the material.

One of the problems encountered in making battery paste is the fact that during the mixing of the ingredients, large quantities of heat are released because of the chemical reaction taking place and this heat must be rapidly and efficiently carried away in order to provide a controlled temperature to produce high quality battery paste.

Another problem is the fact that battery paste mixtures are extremely corrosive and as soon as the mixing of a batch is completed, the material must be rapidly and completely removed from the mixing chamber so that the chamber may be thoroughly cleaned, washed and rinsed to inhibit corrosion to the maximum extent.

In the present invention, the apparatus includes a mixing chamber which is provided with a highly efficient means for directly cooling the bottom wall and the lower side wall portions of the mixing chamber to a maximum extent. In addition, the mixing system provides for complete water wash down of the inside surfaces of the chamber after each batch is discharged and this wash down liquid retains oxides which would otherwise be flushed away. The wash water is retained and is used as make-up liquid for the next batch of paste to be mixed. This arrangement not only reduces corrosion, but also saves labor and time and retains needed chemicals which would otherwise be wasted and might eventually cause water pollution problems.

SUMMARY OF THE INVENTION

The foregoing and other objects and advantages of the present invention are accomplished in a new and improved apparatus for making battery paste comprising a mixing chamber having a floor, a cylindrical upstanding side wall and a top cover or hooded enclosure. A mixing head is mounted for rotation in the chamber including at least one mulling wheel for mulling the battery paste against the floor and at least one scraper blade is provided for moving the battery paste toward the path of the mulling wheel as it moves around the chamber. A cooling system for the chamber and contents includes an air plenum chamber in direct contact with the underside or floor of the chamber and a plurality of riser ducts in communication with the plenum chamber extend upwardly in direct contact with the side walls of the chamber. A plurality of outlets are provided adjacent the upper end of the risers for injecting cooling air downwardly into the mixing chamber toward the batch of battery paste being mixed. This cooling air and any airborne fumes developed in the mixing process are removed from the chamber via an outlet in the cover or hood structure and the excess heat and moisture is carried away to provide a controlled temperature process. A liquid supply system is provided for washing down and additionally cooling the interior surfaces of the mixing chamber and the hood structure and the system includes a plurality of multi-directional spray nozzles which direct the cooling water onto all of the surfaces of the chamber and the mixing head components. The wash water is retained in the water tight lower portion chamber for use as make-up liquid for the following batch of battery paste and thus, useful chemicals in the wash water are retained and saved thus, reducing material costs.

In accordance with the method of the present invention, wash down water introduced into the mixing chamber after discharge of each batch of battery paste is retained in the water tight chamber for use as make-up water for the next batch. Solid material is automatically metered into the retained liquid and is blended therewith. At the proper time a metered quantity of acid and additional liquid is introduced into the process and the paste is mulled and mixed until a desired consistency is obtained. During the process the excess heat developed because of the chemical reaction taking place is carried away by the flow of air first passing through the plenum chamber and rises and then directly through the chamber. This coolant air carries away fumes, heat and excess moisture developed in the process.

BRIEF DESCRIPTION OF THE DRAWINGS

For better understanding of the present invention, reference should be had to the following detailed description taken in conjunction with the drawings in which.

DESCRIPTION OF THE PREFERRED EMBODIMENT

Figure 1:
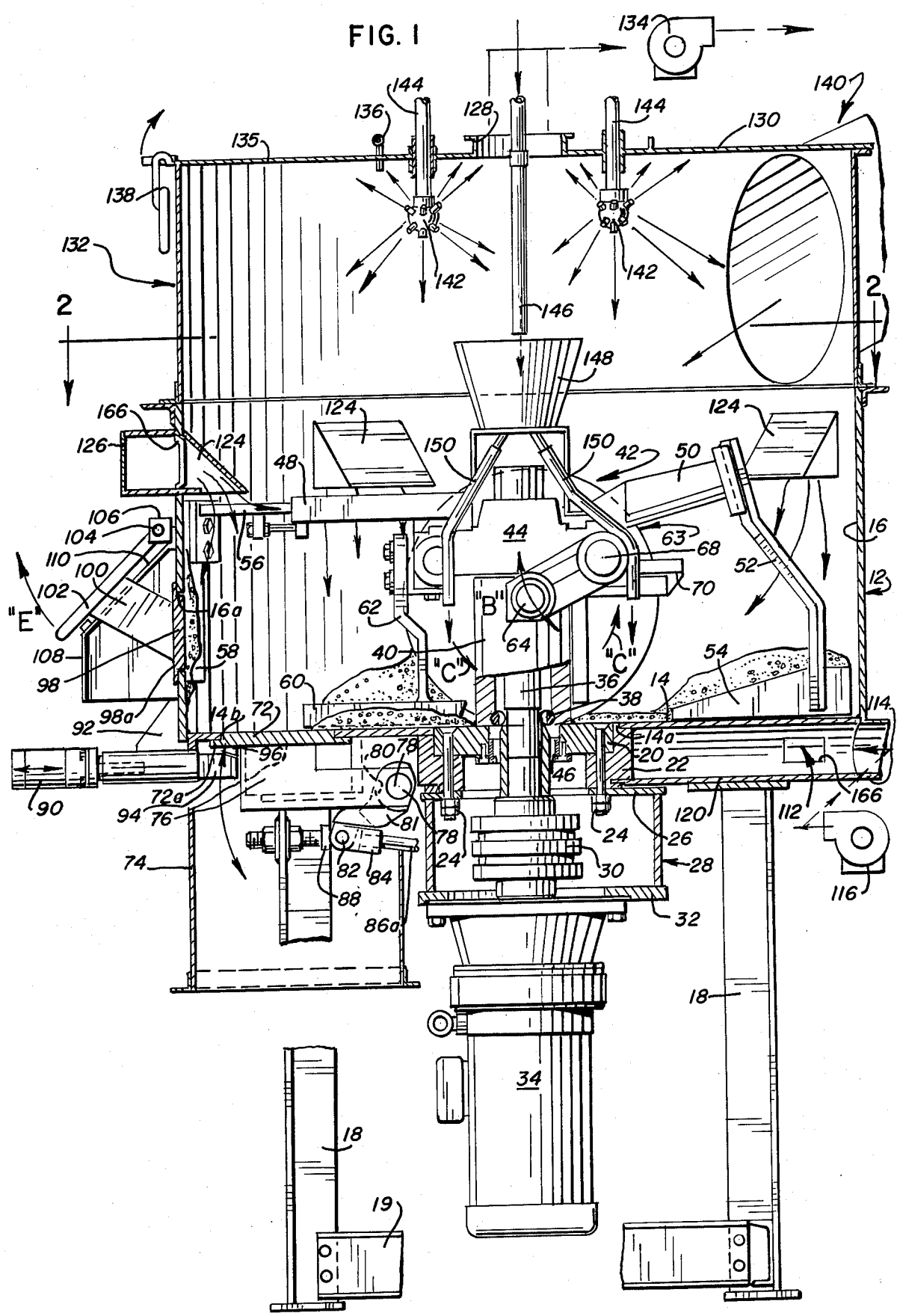
FIG. 1 is a vertical cross-sectional view taken substantially along lines 1—1 of FIG. 2.

Referring now more particularly to the drawings, therein is illustrated a new and improved apparatus for making battery paste constructed in accordance with the features of the present invention and referred to generally by the reference numeral 10. The apparatus 10 includes a cylindrical mixing chamber 12 having a circular bottom wall or wear plate 14 and a cylindrical, upstanding side wall 16 welded thereto to form a water tight mixing pan or base. The chamber is supported on a plurality of legs 18 and crossbraces 19 are provided to interrconnect the lower end portions of the legs.

At the center, the wear plate 14 is formed with a circular aperture 14a in which is seated an annular bearing support ring 20 which in turn is retained within a annular recess of a heavy support collar 22. The ring is removably secured by means of a plurality of bolt and nut assemblies 24 as shown in FIG. 1. The heavy collar 22 is welded to the wear plate 14 around the periphery of the central aperture 14a and the lower end of the collar is closed off by a plate 26 having a circular opening therein which forms the upper wall of a housing 28 which encloses a drive coupling 30. The housing includes a relatively heavy lower wall 32 which serves as a mounting plate for supporting the flanged upper end of a gear motor drive unit 34 attached thereto by a plurality of bolts. A vertical output shaft of the gear motor is interconnected to the coupling which is connected to the lower end of a vertical drive shaft 36 supported in a pair of bearings 38 mounted in an upright sleeve 40 which extends upwardly of the bearing ring 20 (as best shown in FIG. 1) into the mixing chamber 12.

When the gear motor 34 is energized, the vertical drive shaft 36 is rotated at a relatively slow speed to rotate a mixing head assembly generally indicated by the reference numeral 42. The mixing head assembly includes a head 44 mounted on and secured to rotate with the upper end of the drive shaft 36 and preferably the head is formed of cast iron or the like. The lower end of the upright sleeve 40 is welded to the collar 20 and is removable therewith after the bolt and nut assemblies 24 are loosened and the coupling 30 is detached from the drive shaft. The mixing head assembly 42 may then be removed upwardly from the mixing chamber 12. A shaft seal 46 is provided around the lower portion of the drive shaft within the bearing ring 20 to prevent leakage of grease or other packing materials around the bearings and shaft 36 within the sleeve 40. The mixing head 44 provides support for a pair of oppositely outwardly extending plow support arms 48 and 50. At the outer end, the arm 50 supports an upright leg 52 which carries a curved outer scraper blade or plow 54 having an outer edge adapted to pass in close proximity to the lower portion of the side wall 16 for moving material inwardly thereof as the mixing head is rotated in a counterclockwise direction around the chamber as indicated by the arrow "A" in FIG. 2. The outer plow is adapted to continually move material away from the periphery of the mixing chamber side wall 16 toward the interior portion of the mixing chamber and in addition, the plow includes a lower edge which is adapted to continuously turn and remove material from the upper surface of the bottom wall 14 as the mixing head rotates. At the outer end of the arm 48 there is provided a side wall scraper support assembly 56 which carries a side wall scraper blade 58 adapted to remove material from an upper intermediate portion of the cylindrical side wall 16 above the lower outer scraper blade 54. The mixing head 44 also supports an inside plow or scraper 60 attached to the lower end of a support leg 62 secured to the head. The inside plow is adapted to move material on the bottom wall 14 of the mixing chamber outwardly away from the sleeve 40 and to turn and move the material off the bottom wall. Both plows move the material into an intermediate concentric path around the chamber traversed by a pair of large, heavy, cylindrical, mulling wheels 63. As the mixing head is rotated, the mulling wheels knead and squeeze the material against the circular bottom wall 14 and the plows 54 and 60 continually turn the material away from the bottom and move it into the path of the oncoming mulling wheels. The mulling wheels 63 are supported on independent axles 64 extending outwardly of a pair of support arms 66 on opposite sides of the head 44. The arms are journaled for free floating rotation on stub shafts 68 projecting outwardly from opposite sides of the mixing head 44 in a direction generally normal to the arms 48 and 50. As shown in FIG. 1, the mulling wheel support arms 66 are free to pivot on their respective support axles 68 so that the axles 64 which journal the mulling wheels move freely up and down (as shown by the arrow "B") as the mulling wheels ride up on the mass of battery paste contained in the mixing chamber. This action continuously kneads and squeezes the paste with the desired mulling action.

In order to prevent battery paste from collecting and building up on the sides and the cylindrical mulling surfaces of the mulling wheels 63, each wheel is provided with a U-shaped, scraper bar 70 arranged to lie in a generally horizontal plane and having an inside leg supported from the arm 66 that carries the mulling wheel. The wheels rotate (arrows "C", FIG. 1) as the mulling head assembly 42 is driven around the mixing chamber and any material building up on the wheels is continuously removed by contact against the scraper bars 70 so the mulling wheels perform efficiently and present a relatively clean mulling surface for mulling of the battery paste.

In accordance with the invention, the mixing chamber bottom wall 14 is formed with a rectangular discharge opening 14b adjacent one portion and a discharge door 72 is designed to open and close the opening for discharging a completed batch of battery paste from the mixing chamber downwardly via a discharge chute 74 (FIG. 1) which extends downwardly of the bottom wall structure of the mixing chamber. As best shown in FIG. 1, the upper surface of the discharge door 72 is designed to be level or even with the upper surface of the circular bottom wall 14 when the door is in a closed position and around the periphery of the door there is provided a lip 72a which seals the opening 14b with a water tight seal when the door is closed. The edges of the door and the corresponding edges of the opening 14b are dimensioned to fit closely and thereby provide a close seal to prevent the loss of wash down make-up liquid. The door is supported on a pair of arms 76 secured to the underside and these arms are connected at their inner ends and are supported from an axle 78 which is journaled in a sleeve 80 mounted on the underside of the bottom wall structure. At one end, the axle is provided with an actuating arm 80 connected at its outer end to a wrist pin 82 secured to a clevis 84 on the outer end of a piston rod 86a of an actuating cylinder 86. The opposite end of the actuating cylinder is pivotally secured to the bottom wall structure of the mixing chamber. When the cylinder is pressurized to move the piston rod 86a outwardly, the door is moved to a closed position. An adjustable stop bolt assembly 88 mounted on one of the legs 18 (FIG. 1) is provided to limit outward travel of the piston rod 86a when closing the door.

In order to hold and positively latch the door 72 in the closed position, the mixer is provided with a door latching cylinder 90 supported on brackets 92 and adapted to move a latch member 94 into and out of engagement with a wedge block 96 on the under side of the discharge door as best shown in FIG. 1.

The apparatus 10 also includes provision for taking periodic samples of the battery paste mixture contained in the mixing chamber 12 during the process and for this purpose, a generally rectangular sample access opening 16a is formed in the upstanding cylindrical side wall of the mixing chamber at and appropriate level. This sample opening is adapted to be closed by means of a sample door 98 having an outer peripheral flange adapted to seal tightly against the adjacent outer surface of the side wall 16 when the door is closed. The sample door is supported on a bracket 100 which is carried by a U-shaped handle 102 pivotally secured to the outer wall of the mixing chamber by a pivot pin 104 mounted in brackets 106 attached to the outer surface of the mixing chamber side wall 16. The door and support bracket 100 are enclosed within a fume hood structure 108 which helps prevent acid fumes from bothering the person taking a sample. The hood is open at its ends for easy removal of a sample and when the door 98 is closed, the upper end is closed off by a sloped top wall 110 which is mounted to move with the door operating handle 102. When it is desired to take a sample, the door is pivoted to an open position by upward movement of the handle 102 in the direction of arrow "E" (FIG. 1). The sample is extracted from the interior of the mixing chamber and the door is closed.

Figure 2:
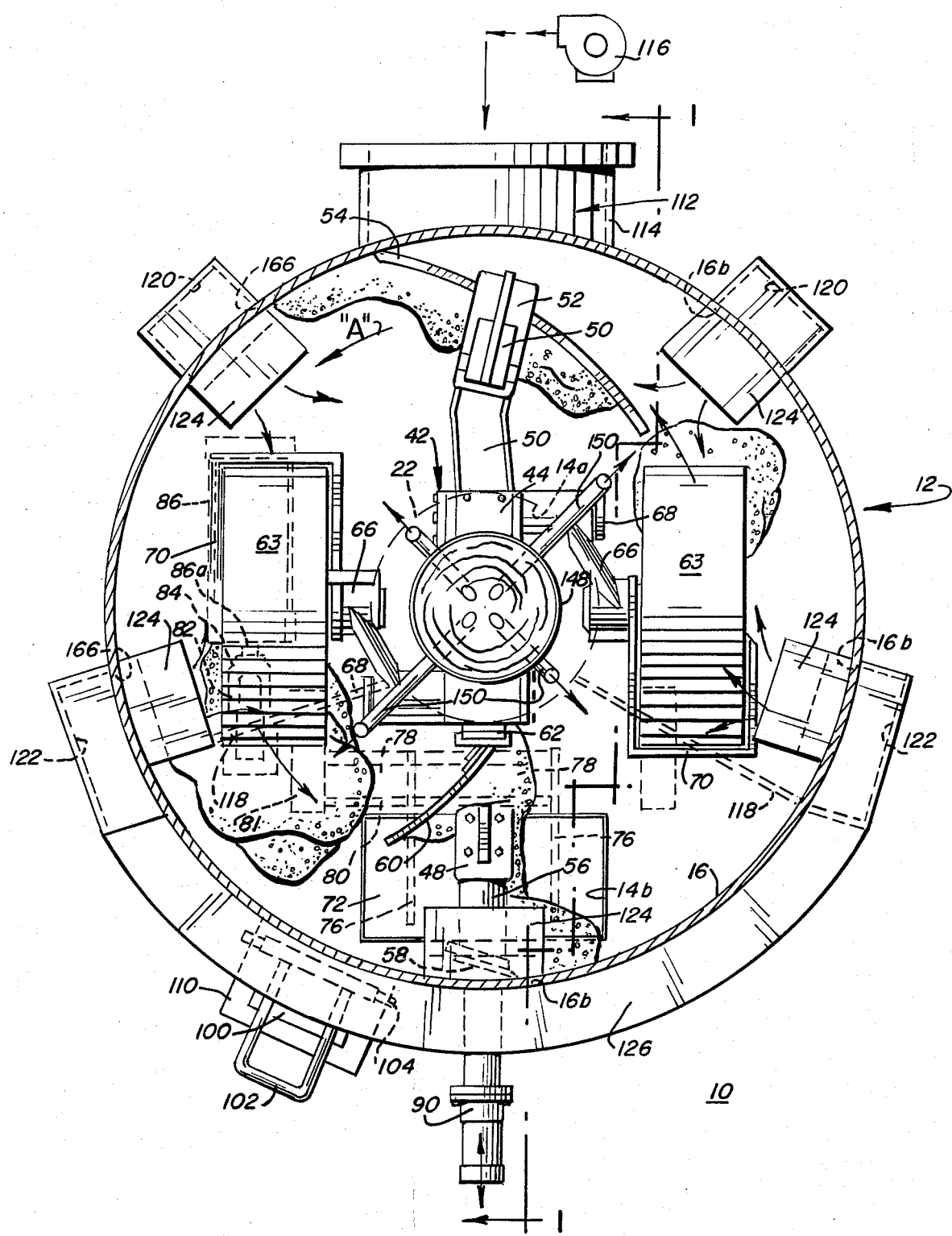
FIG. 2 is a horizontal sectional view taken substantially along lines 2—2 of FIG. 1.

In accordance with the present invention, the bottom wall 14 of the mixing chamber 12 is directly cooled by a plenum chamber 112 formed beneath and in direct contact with the underside of the wall. The plenum chamber includes an inlet section 114 adapted to be supplied with a flow of cooling air from a fan 116 or other suitable air source via a duct or other connecting conduit (not shown). The plenum chamber is generally annular in plan as shown in FIG. 2, and the outer side wall is formed by an extension of the cylindrical side wall 16 below the level of the circular bottom wall 14.

The plenum is circular in shape except for a wedge or pie shaped portion in the vicinity of the discharge door 72. In this area, the plenum chamber includes radial walls 118 extending outwardly of the central support collar 22 at the center of the mixing chamber to the outer side wall 16. The bottom of the plenum chamber is provided with a generally circular wall 120 as shown in FIG. 1 and substantially the entire surface underside of the bottom wall 14 is thus in direct contact with the cooling air flow passing through the plenum chamber to carry heat away from the wall structure.

The cooling air is eventually introduced into the interior of the mixing chamber 12 and for this purpose, there is provided a plurality of channel shaped vertical risers 120 and larger risers 122 which are secured to the outer surface of the cylindrical side walls 16 of the mixing chamber. Each of the risers is closed at its lower end and is adapted to receive coolant air from the plenum chamber through an opening 16c in the cylindrical side wall portion forming the outer side wall of the plenum chamber. The inside surface of each riser is formed by the wall 16 of the mixing chamber so that direct cooling of the side wall occurs as the coolant air flows upwarding in the risers 120 and 122.

At the upper end, each riser is capped and the air flows inwardly into the mixing chamber through the rectangular openings 16b formed in the side wall 16. The openings 16b are in communication with downwardly sloping deflection hoods 124 mounted on the inside surface of the side wall 16 of the mixing chamber adjacent an upper level above the batch of material normally contained. Because the plenum chamber 112 is discontinuous in the area beneath the discharge door 72, and because it is desirous to have a relatively uniform distribution of coolant air from the plenum chamber over the surface of the material contained in the mixing chamber, the larger risers 122 are adapted to feed deflection hoods 124 adjacent their upper ends and a separate deflection hoods 124 spaced generally above the discharge door. As viewed in FIG. 2, the discharge hoods are equilaterally spaced around the periphery of the mixing chamber and dependent on the diameter of the mixing chamber and the number of outlets desired, the angular spacing between adjacent outlets will vary. In order to provide cooling air to the deflection hood 124 positioned above the discharge door 76, an arcuate feed duct 126 is interconnected between the upper ends of the larger risers 122 as shown in FIG. 2, and this arcuate duct receives coolant air from the risers and directs the flow into the single discharge hood centrally positioned thereon. The downwardly sloping top deflector wall of the hoods 124 directs the coolant air downwardly onto the mass of battery acid paste being treated in the mixing chamber. Acid fumes and vapor rising from the mass as the chemical reaction takes place are carried away and cooled by this cooling air and the air is exhausted from the enclosed mixing chamber through a central outlet 128 formed in the top wall 130 of an exhaust hood or removable cover 132 which covers the upper end of the mixing chamber 12.

Coolant air, fumes and moisture from the mass of battery paste in the mixing chamber are removed via the outlet fitting 128 which is normally connected to a duct or plenum (not shown) and an exhaust fan 134 (shown schematically in FIG. 1) is used to move the air. The fans 116 and 134 are adjusted so that a slight negative pressure will be maintained within the mixing chamber 12 in order to insure that acid fumes do not tend to escape outwardly into the immediate vicinity surrounding the apparatus 10. Any air leakage that occurs results in air flowing inwardly into the mixing chamber rather than the opposite.

In order to provide access to the interior of the chamber through the exhaust hood or cover 132, a door section 135 of the top wall 130 is hingedly attached to the main portion of the wall with hinges 136 and the latch 138 is provided adjacent the outer edge of the door. When the latch is released, the door 134 may be opened upwardly as indicated by the arrow "D" (FIG. 1) to provide direct access to the interior of the mixing chamber 12 from above.

The solid ingredients used for making up each batch of battery paste in the mixer 10 is introduced into the mixing chamber 12 through an inlet chute 140 having its discharge end supported in the side wall of the top cover or exhaust hood 132. A metered batch of material is introduced into the mixing chamber and flows onto the floor 14 of the mixing chamber for mixing and mulling by the plows and mulling wheels as the mixing head rotates. After a batch of battery paste is completely mixed and reaches a proper consistency, the discharge door 72 is opened and the rotating mixing head 42 helps to move the material out through the discharge opening 14b through the open door. After a batch has been discharged, the door is closed to again form a water tight pan in the lower end of the mixing chamber. Washing water is introduced into the mixing chamber to clean the interior surfaces through a plurality of nozzle structures 142 which are supported from the upper wall 130 of the hood structure 132. The nozzles are supplied with a metered quantity of water for a selected time period via conduits 144. Each nozzle has multiple discharge orfices for directing the wash down water in a variety of directions including upwardly against the surface of the top wall 130 of the hood structure, outwardly against the cylindrical side wall of the hood and the wall 16 of the mixing chamber and inwardly and downwardly onto the rotating mixing heads 42 and the floor 14 of the mixing chamber. The washing action of the finally divided water spray reduces the corrosion of the interior surfaces of the apparatus and also serves to collect and save chemicals and oxides which would otherwise be lost because the metered batch of wash water is collected in the bottom water tight pan of the mixing chamber 12 for use as make-up water in the succeeding batch of battery paste. The solid material introduced into the mixer through the inlet chute 140 flows into and is blended with the make-up water which already contains oxides and other chemicals which would otherwise have to be added. This arrangement not only saves considerable time but saves the additional cost or value of the chemicals retained in the wash water which do not need to be supplied in the succeeding batch. The substantial savings in lead oxides provides an economic system of operation not heretofore thought possible.

Acid for use in the battery paste is introduced via a supply line 146 which discharges a metered quantity of acid into a funnel type holding pan 148 of acid resistant material mounted on top of the rotating mixing head 44. Acid is metered slowly out of the holding funnel 148 through a plurality of tubes 150 having discharge outlets spaced substantially equilaterally with respect to the head so that the acid flows and blends readily into the wetted mass of material in the mixer chamber.

The wash down water that is sprayed onto the surfaces of the mixing chamber serves to additionally cool the material, and the structure as well as blend into the battery paste and the discharge of the wash water through the nozzles is timed and the flow rate is adjusted to provide for the desired amount of make-up water for the next succeeding batch. Similarly, the solid material supplied via the inlet chute 140 is automatically timed and metered in quantity to provide the precise amount required for a batch. The same is true for the acid which is metered into the acid holding distributor pan for gradual distribution into the wetted mass of material via the equilaterally spaced conduits 150.

The mixing chamber is directly cooled by the plenum chamber 112 on the bottom wall and the risers 120 and 122 on the side wall 16 directly cool the side of the chamber. In addition, the coolant air flows into the chamber to cool the mass of material contained therein and to carry away heat, fumes and excess moisture in an efficient manner so that corrosion is minimized. The method described reduces the cost of producing battery paste because oxides and chemicals are saved and retained with the wash water rather than being carried away to a sewer or the like where they could cause water pollution problems. The amount of air flow through the plenum chamber 116 is carefully controlled to provide for fast heat carry-off at a controlled rate and the direct contact between the chamber wall surfaces and the coolant air path provides for a maximum of heat transfer without requiring water jackets or the like.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. Apparatus for making battery paste comprising:
   an enclosed mixing chamber having a floor, a cylindrical upstanding side wall and a top cover,
   a mixing head mounted for rotation in said chamber including at least one mulling wheel for mulling said battery paste against said floor and at least one plow for moving said battery paste into the path of said mulling wheel,
   means for cooling said mixing chamber and contents including a plenum chamber in contact with the underside of said floor, a plurality of riser ducts extending upwardly of said plenum chamber in contact with said side wall, a plurality of air outlets adjacent the upper end of said risers for injecting cooling air downwardly into said mixing chamber and outlet means in said cover for removing heated air from said chamber, and
   liquid supply means for washing the interior surfaces of said chamber and supplying liquid for said battery paste including at least one spray nozzle having outlets directed toward said cover, said side wall and said floor of said chamber and conduit means for supplying liquid to said nozzle unit.

2. The apparatus of claim 1 wherein said cylindrical side wall is welded to the peripheral edge of said floor in a water tight joint.

3. The apparatus of claim 1 wherein said floor of said mixing chamber forms a top wall of said cooling plenum chamber.

4. The apparatus of claim 3 wherein said cylindrical side wall of said mixing chamber forms an inside wall of said riser ducts.

5. The apparatus of claim 1 including a discharge opening formed in said floor of said mixing chamber, a discharge door adapted to open and close said opening, and seal means forming a water tight seal between said door and said floor around the edge of said opening when said door is closed.

6. The apparatus of claim 1 including a storage pan for receiving acid mounted to rotate with said mixing head and a plurality of dispensing tubes equilaterally spaced around said head for distributing acid from said pan into the battery paste contained in said mixing chamber.

7. The apparatus of claim 1 wherein said mixing head includes a pair of mulling wheels on opposite sides movable around a circular path inwardly of said upstanding side wall and a plurality of plows for moving the material in said mixing chamber into said path and removing material from said side wall.

* * * * *